United States Patent [19]
Tsui

[11] Patent Number: 5,477,230
[45] Date of Patent: Dec. 19, 1995

[54] AOA APPLICATION OF DIGITAL CHANNELIZED IFM RECEIVER

[75] Inventor: James B. Y. Tsui, Dayton, Ohio

[73] Assignee: The United States of America as represented by the Secretary of the Air Force, Washington, D.C.

[21] Appl. No.: 269,318

[22] Filed: Jun. 30, 1994

[51] Int. Cl.$^6$ .................................................. G01S 5/04
[52] U.S. Cl. .......................... 342/442; 342/156; 342/424; 342/196
[58] Field of Search ................................... 342/442, 156, 342/424, 196, 432

[56] References Cited

U.S. PATENT DOCUMENTS

| | | | |
|---|---|---|---|
| 4,017,859 | 4/1977 | Medwin | 342/383 |
| 4,546,354 | 10/1985 | Boles | 342/179 |
| 4,563,686 | 1/1986 | Boles | 342/25 |
| 4,996,533 | 2/1991 | May et al. | 342/108 R |
| 5,102,219 | 4/1992 | Skagerlund | 356/5 |
| 5,198,748 | 3/1993 | Tsui et al. | 324/76.35 |
| 5,235,287 | 8/1993 | Sanderson et al. | 324/76.35 |
| 5,262,837 | 11/1993 | Shyy | 356/5 |
| 5,280,288 | 1/1994 | Sherry et al. | 342/83 |
| 5,285,209 | 2/1994 | Sharpin et al. | 342/424 |
| 5,302,957 | 4/1994 | Franzen | 342/125 |

Primary Examiner—Thomas H. Tarcza
Assistant Examiner—Dao L. Phan
Attorney, Agent, or Firm—Bernard E. Franz; Thomas L. Kundert

[57] ABSTRACT

This system compares the phases from Fast Frequency Transform (FFT) outputs to obtain angle of arrival (AOA) information.

3 Claims, 2 Drawing Sheets ately sampled and further processing is done using digital techniques. The frequency of the incident radiation may be determined by performing a discrete Fourier transform on the sampled signal.

AOA APPLICATION OF DIGITAL CHANNELIZED IFM RECEIVER

RIGHTS OF THE GOVERNMENT

The invention described herein may be manufactured and used by or for the Government of the United States for all governmental purposes without the payment of any royalty.

RELATED APPLICATION

The invention described herein makes use of the principle disclosed in my co-pending patent application Ser. No. 264,317 filed Jun. 30, 1994, and in a paper by T. W. Fields, D. L. Sharpin and J. B. Tsui titled Digital Channelized IFM Receiver, presented at the IEEE MTT-S International Microwave Symposium, May 24–26, 1994 at San Diego Calif., and published in the Digest of the Symposium. The patent application and paper are hereby incorporated by reference.

BACKGROUND OF THE INVENTION

The present invention relates generally to the field of instantaneous frequency measurement receivers with digital processing, and more particularly to an angle-of-arrival (AOA) application of a digital channelized IFM receiver.

The conventional IFM receiver is a radio frequency receiver used primarily in electronic warfare. Its basic function is to measure the frequency of pulsed signals radiated from hostile radar. Generally, it may be said that IFM receivers measure the frequencies of incoming RF signals utilizing interferometric techniques by detecting the phase shift magnitudes produced in multiple, calibrated delay lines. For instance, the received RF signal is divided and simultaneously introduced into a non-delayed path and a delay line of known length. Since the delay and non-delayed receiver paths are functions of the input signal frequency, conversion of the phase difference signals to video signals provides signals whose amplitudes are related to phase delay. These signals typically take the form of sin ωτ or cos ωτ, where ω is the angular frequency or the processed input signal, and τ is the known time delay. The sin ωτ and cos ωτ signals are delivered to an encoding network which makes amplitude comparisons of the signals, determines the numerical value of ω, and generates the digital frequency descriptive word.

An IFM receiver has many attractive features necessary for electronic warfare applications, such as small size, light weight, wide instantaneous bandwidth, and fine frequency resolution.

In a digital receiver, the incident radiation is mixed with a local oscillator signal and down converted to an intermediate frequency (IF). This IF signal is discretely sampled and further processing is done using digital techniques. The frequency of the incident radiation may be determined by performing a discrete Fourier transform on the sampled signal.

The following United States patents are of interest.

U.S. Pat. No. 5,280,288—Sherry et al
U.S. Pat. No. 5,262,837—Shyy
U.S. Pat. No. 5,235,287—Sanderson et al
U.S. Pat. No. 5,198,748—Tsui et al
U.S. Pat. No. 5,102,219—Skagerlund
U.S. Pat. No. 4,996,533—May et al The patent to May et al discloses a method for mapping ocean currents using a linear array of antennas each with its own receiver/digitizer system. The summing and phasing of the signals are done using two successive complex Fourier transforms. The patents to Sanderson et al and Tsui et al disclose the use of sample signals being further transformed and the phase and amplitudes calculated. The patent to Sherry et al discloses the use of Fast Fourier Transform in target detection systems. The patents to Skagerlund and Shyy disclose digitization of the received signals.

SUMMARY OF THE INVENTION

An objective of the invention is to provide an improved receiver for measuring angle of arrival.

According to the invention, digital channelized instantaneous frequency measurement (IFM) receivers are used to measure the angle-of-arrival (AOA) of input signals. The advantage of this approach is that it can process simultaneous signals.

DETAILED DESCRIPTION

Figure 1:
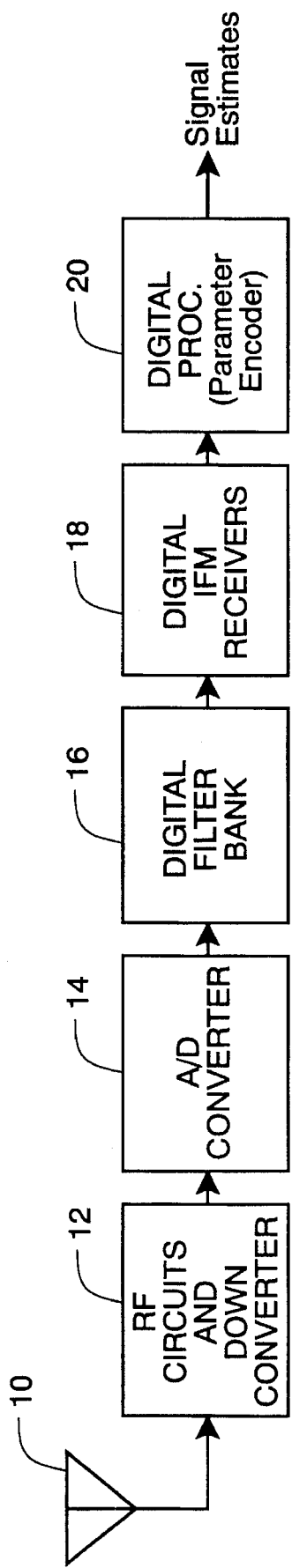
FIG. 1 is a block diagram showing a frequency measurement receiver system having an instantaneous frequency measurement receiver (IFM) at each output of a digital channelized receiver.
Figure 1A:
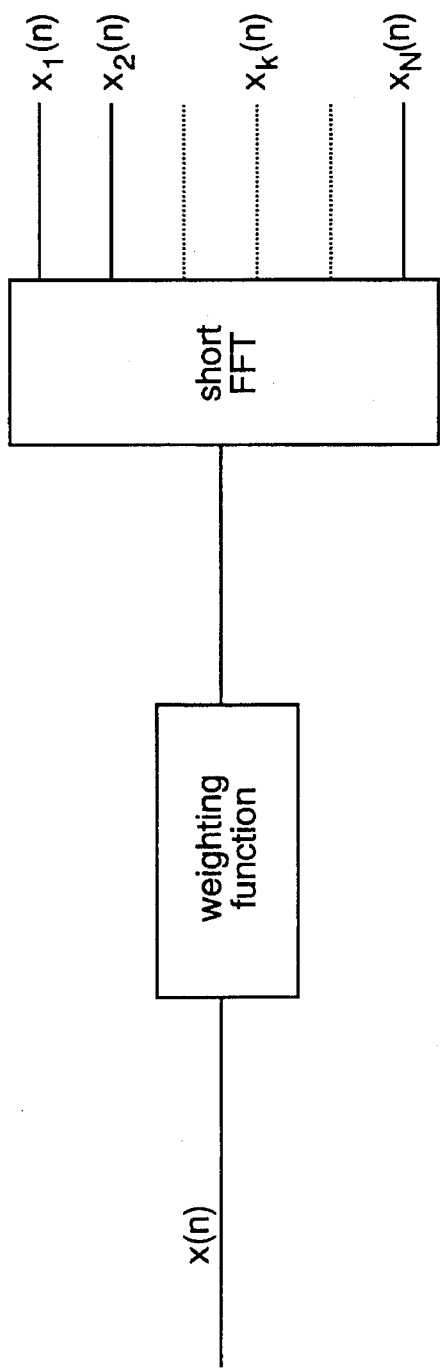
FIG. 1a is a block diagram showing the digital filter bank of FIG. 1.

My said RELATED APPLICATION discloses an instantaneous frequency measurement (IFM) receiver at each output of a digital channelized receiver, as shown in FIGS. 1 and 1a. It can be used to determine the output frequency from the channelized receiver.

FIG. 1 is a block diagram showing a frequency measurement receiver system having an instantaneous frequency measurement receiver (IFM) at each output of a digital channelized receiver. Signals received at an antenna 10 are supplied to block 12 which comprises RF circuits and a down converter. The IF signals from block 12 are supplied to an analog-to-digital converter 14, and the digital signals are channelized in a digital filter bank 16. At block 18, a digital IFM receiver is formed for the output of each digital channel. The digital output signals from block 18 are supplied to a signal processing block 20 to encode the various parameters including the frequencies of the input signals.

Using fast Fourier transform (FFT) or its related techniques to build a digital channelized receiver is probably the most promising approach. The most straight forward way is to use a properly selected weighting function to condition the data. A short time FFT operation is used to perform the channelization as shown in FIG. 1a, which shows a simple way to build the digital filter bank 16 for the digital receiver of FIG. 1.

The conventional thought is to compare the amplitude of the outputs from different channels to determine the center of the radio frequency (RF) of the input signal. This approach was experimented many times in analog receiver designs. The results were usually poor. This approach generates many spurious responses, if the dynamic range is high i.e. over 25 dB. The major difficulty is that the gains of all the channels can not be made equal in an analog receiver. The approach may generate better results in a digital receiver, because all of the channels in the receiver are better balanced through the FFT operation.

To improve the frequency resolution from a channelized receiver, IFM receivers are added to the output of every channel in analog channelized receiver design. In the digital channelized receiver, an IFM receiver can be built at each output with no additional hardware. The only requirement in design is to process the output from the channels differently.

The receiver can work with the arrangement shown in FIG. 1a and other possible digital channelized receiver designs with FFT to perform the channelization. The only requirement is that the channel output contains the RF information. This information can be either in real or complex form. In the FFT outputs, the channel outputs are complex which makes the IFM receiver very simple.

Let us use an example to demonstrate this idea. The input contains 1024 data points. In the data points 600 points (from 212 to 812) contain a sine wave. A hanning window is used to modify the input data and 128 point short FFT is used to perform the channelization. Because the input data are real, a 128 point FFT will produce 64 channels. This short FFT is overlapped 127 points. In other words, it is a one point sliding FFT. The output of each channel can be written as $I_i(t_j)$ and $Q_i(t_j)$ where i=1 to 64 representing the output channel number and j=1 to 897 (1024−128+1) representing the output time. From these outputs one can find the phase of the output signal as $$\Theta_i(t_j) = \tan^{-1} \left[ \frac{I_i(t_j)}{Q_i(t_j)} \right] \quad (1a)$$

The phase difference of each channel can be found as $$\delta\Theta_i(t_j) = \Theta_i(t_{j+1}) - \Theta_i(t_j) \quad (2a)$$

The frequency of the output signal can be found from $$f_i = \frac{\delta\Theta_i(t_j)}{t_{j+1} - t_j} \quad (3a)$$

AOA APPLICATION

The digital receiver can be used to separate signals according to their input frequencies. The phase relation obtained from the IFM receiver can be used to find the fine frequency of the input signal. However, in this approach, multiple antennas will be used. The phase difference between antennas is used to measure AOA of the input signals.

Figure 2:
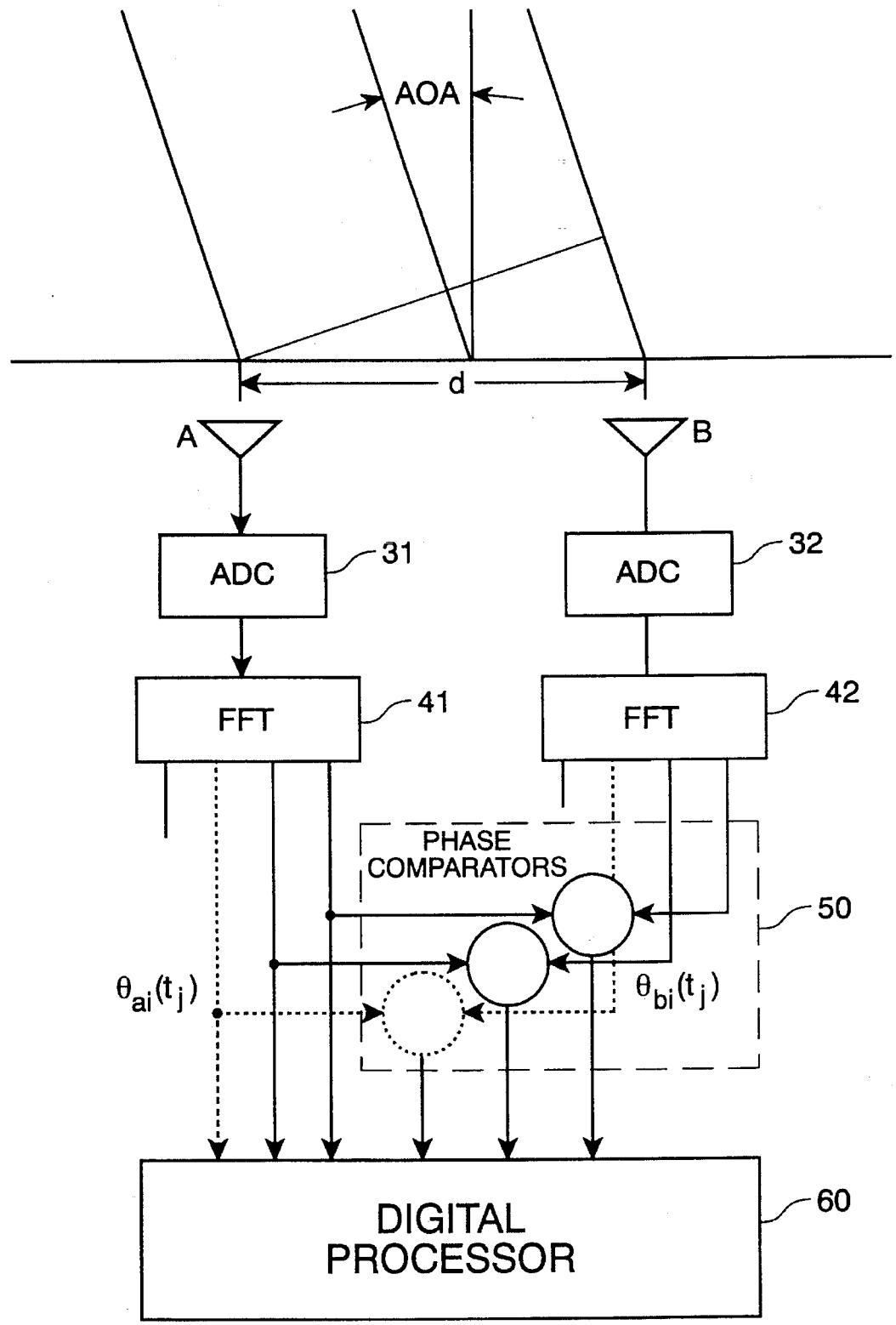
FIG. 2 is a block diagram showing a system with two antennas using digital channelized instantaneous frequency measurement (IFM) receivers to measure the angle-of-arrival (AOA) of input signals.

This approach usually has many antennas and each antenna is followed by a digital channelized IFM receiver. In order to simplify the explanation, a two antenna system as shown in FIG. 2 will be discussed. The outputs from the two antennas A and B will be digitized in analog-to-digital converters 31 and 32 respectively and in units 41 and 42 respectively a fast Fourier transform (FFT) will be performed on the data. The FFT outputs derived from signals from the antennas A and S can be written as $I_{ai}(t_j)$, $Q_{ai}(t_j)$, $I_{bi}(t_j)$, $Q_{bi}(t_j)$ where subscripts a, b represent the antennas A and B; i represents the number of output channel from the FFT output; j represents time. The signals from the FFT units 41 and 42 are supplied to phase comparators 50, and also to a digital processor 60. The phase relation can be obtained as $$\Theta_{ai}(t_j) = \tan^{-1} \left[ \frac{I_{ai}(t_j)}{Q_{ai}(t_j)} \right] \quad (1)$$

$$\Theta_{bi}(t_j) = \tan^{-1} \left[ \frac{I_{bi}(t_j)}{Q_{bi}(t_j)} \right]$$

The AOA information can be found from the phase difference between two antennas at the same output channel and the same time. The same channel means the same frequency (or the same signal). Let us find the phase difference between the two channels as $$\delta\Theta_{ab,j}(t_j) = \Theta_{ai}(t_j) - \Theta_{bi}|t_j| \quad (2)$$

If the distance between the two antennas is d and the input frequency is ensured f, the conventional phase measurement system can be written as $$\phi = \frac{2\pi d \sin\Psi}{\lambda} \quad (3)$$

where $\Phi = \Theta_{ab,j(t_j)}$ is the phase difference between the two antennas, $\psi$ is the AOA of the input signal, and $\lambda$ is the wavelength. The wavelength is related to the signal frequency as $\lambda = C/f$ where C is the speed of light. The frequency f may be found in the processor 60 using equation 3a above, as in my RELATED APPLICATION. Substituting these relations into equation (3), the result is $$AOA = \sin^{-1} \left[ \frac{C \times \Theta_{ab,i}(t_j)}{2\pi f d} \right] \quad (4)$$

This equation will produce ambiguity, if d>$\lambda$/2. In order to avoid this ambiguity, the antenna separation must be less than $\lambda$/2.

If there are simultaneous signals of different frequencies, the phase difference measured at different frequency channels i.e. different i values, can be used to find the AOA of them. If the phase differences at many different times i.e. different j values, are used to find the AOA, the measurement accuracy can be improved through averaging over time.

This application can be extended to systems with more than two antennas.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. Apparatus for measuring an angle of arrival AOA of an incoming signal using at least two antennas designated as first and second antennas separated by a distance d;

wherein said apparatus uses a digital channelized IFM (Instantaneous Frequency Measurement) receiver comprising first means for receiving RF input signals from at least one of said antennas and for converting the RF input signals to IF signals, analog-to-digital conversion means coupled to the first means for converting the IF signals to digital signals at D data points, the analog-to-digital conversion means being coupled to digital filter bank means for providing channelized digital signals using a P point short FFT (Fast Fourier transform) to perform the channelization to provide i=1 to P/2 channels, digital IFM receiver means for processing the channelized digital signals to effectively provide digital IFM receiver means for the output of each channel;

wherein the short FFT is overlapped P−1 points, and the output of each channel is written as $I_i(t_j)$ and $Q_i(t_j)$ where I and Q are inphase and quadrature components of a complex form, i represents output channel number, and j=1 to (D−P+1) represents the output time, and the means for finding a phase $\Theta_i$ of each output signal as $$\Theta_i(t_j) = \tan^{-1}\left[\frac{I_i(t_j)}{Q_i(t_j)}\right]$$

means for finding the phase difference of each channel as $$\delta\Theta_i(t_j) = \Theta_i(t_{j+1}) - \Theta_i(t_j)$$

and means for finding the frequency of the output signal from $$f_i = \frac{\delta\Theta_i(t_j)}{t_{j+1} - t_j};$$

wherein the frequencies of all channels are measured, if the frequency measured by an IFM receiver matches the center of a channel, that channel contains a signal, and if the frequency measured by the IFM receiver does not match the center of the channel, that channel does not contain a signal, so that using this measurement, the channels containing signals can be identified;

wherein said analog-to-digital conversion means includes first and second converters coupled respectively to said first and second antennas to provide first and second sets of digitized samples in channels i at times j, first and second Fast Fourier Transform (FFT) means coupled respectively to outputs from the first and second converters which perform Fast Fourier Transforms on the digitized data;

means coupled to the outputs of the first and second Fast Fourier Transform (FFT) means for processing the data from the last said outputs using the relation $$AOA = \sin^{-1}\left[\frac{C X \Theta_{ab,i}(t_j)}{2\pi f d}\right]$$

where $\Theta_{ab,i,j(t_j)}$ is the phase difference between the two antennas, f is the frequency of the input signal, X is a multiplication symbol, and C is the speed of light, the separation d between the first and second antennas being less than half the wavelength of the input signal to avoid ambiguity.

2. Apparatus as set forth in claim 1, wherein in response to there being simultaneous input signals of different frequencies, the phase difference measured at different frequency channels, i.e. different i values, is used to find the angle-of-arrival AOA of each of them.

3. Apparatus as set forth in claim 1, wherein the phase differences at many different times i.e. different j values, are used to find the AOA, averaged over time to improve the measurement accuracy.

* * * * *